(12) United States Patent
Boisvert

(10) Patent No.: US 7,186,338 B2
(45) Date of Patent: Mar. 6, 2007

(54) TWIST AND LOCK FILTER HOUSING

(76) Inventor: David Boisvert, 37 Schooner La., Meriden, CT (US) 06451

( * ) Notice: Subject to any disclaimer, the term of this patent is extended or adjusted under 35 U.S.C. 154(b) by 0 days.

(21) Appl. No.: 11/137,170

(22) Filed: May 25, 2005

(65) Prior Publication Data

US 2007/0000829 A1    Jan. 4, 2007

Related U.S. Application Data

(60) Provisional application No. 60/574,087, filed on May 25, 2004.

(51) Int. Cl.
- *B01D 27/08* (2006.01)
- *B01D 35/30* (2006.01)
- *B01D 35/14* (2006.01)

(52) U.S. Cl. .................. 210/232; 210/436; 210/444; 210/450

(58) Field of Classification Search ................ 210/232, 210/436, 444, 450
See application file for complete search history.

(56) References Cited

U.S. PATENT DOCUMENTS

| | | | | |
|---|---|---|---|---|
| 2,991,885 A | * | 7/1961 | Gutkowski | 210/133 |
| 3,746,171 A | * | 7/1973 | Thomsen | 210/234 |
| 3,935,106 A | * | 1/1976 | Lipner | 210/232 |
| 4,102,473 A | * | 7/1978 | Draxler | 220/319 |
| 4,989,636 A | * | 2/1991 | Hunter et al. | 137/557 |
| 5,114,572 A | * | 5/1992 | Hunter et al. | 210/120 |
| 5,334,309 A | * | 8/1994 | Huggett et al. | 210/133 |

* cited by examiner

*Primary Examiner*—Thomas M. Lithgow
(74) *Attorney, Agent, or Firm*—DeLio & Peterson, LLC; Robert Curcio

(57) ABSTRACT

A filter housing having radial sealing means is disclosed herein. Upper bosses and lower bosses can be used to attach the head to the sump for easy opening and closing the filter housing when replacing the filter cartridge. The filter housing of the present invention provides simplified filter cartridge changes to minimize process downtime and without recourse to tools. The filter housing contains fluid flow directing mean to facilitate filter cartridge replacement and safety means to prevent removal of the sump when fluid is passing through the sump.

18 Claims, 7 Drawing Sheets

TWIST AND LOCK FILTER HOUSING

This invention is directed to a filter housing having a radial sealing mechanism such that large axial compression forces are not needed to provide a liquid-tight seal. Additionally, a twist and lock feature can be used to attach the head to the sump for ease of opening and closing the filter housing when replacing the filter cartridge. An inlet valve mechanism is provided to alternate the flow of fluid at the inlet while the filter cartridge is being replaced. Further, the activating lever for the valve mechanism provides a safety feature to prevent accidental sump release when fluid is flowing into the sump.

SUMMARY OF THE INVENTION

The present invention is directed to, in a first aspect, a filter housing comprising: a head having an inlet and an outlet in fluid communication with a filter cartridge; a collar surrounding the head having a plurality of bosses, the collar forming an annular space between an inner wall of the collar and an outer wall of the head; a sump for enclosing the filter cartridge within the filter housing, the sump having a plurality of bosses adapted to align with the plurality of bosses of the collar; a radial sealing means for providing a liquid-tight seal between the sump and the head; a means for depressurizing the sump prior to removing the sump from the head; and a means for locking movement of the plurality of bosses of the sump with the plurality of bosses of the collar when the plurality of bosses are vertically aligned when the sump is inserted into the annular space and twisted. The means for depressurizing the sump may comprise a piston in pressure communication with the sump. The means for locking movement of the plurality of bosses of the sump and the plurality of bosses of the collar may include a lever having a flange that can be inserted into a notch in the collar such that the flange is substantially fitted within a gap between two sets of vertically aligned bosses to prevent the sump from twisting and unlocking from the head.

In yet another aspect, the present invention is directed to a filter housing comprising: a sump for enclosing a filter cartridge within the filter housing, the sump having a plurality of upper bosses along a top, outer peripheral edge; a head having an inlet and an outlet in fluid communication with the filter cartridge, the head removably attached to the sump; a collar surrounding the head forming an annular space between an inner wall of the collar and an outer wall of the head wherein the inner wall of the collar has a plurality of lower bosses corresponding to the upper bosses on the sump; a radial sealing means for providing a liquid-tight seal between the sump and the head; a mechanism for depressurizing the sump and for preventing removal of the sump comprising a piston in pressure communication with the sump, and a lever having a flange, the flange substantially fitted into a gap between two sets of vertically aligned upper and lower bosses, wherein upon actuating the piston to release pressure within the sump, the flange is dislodged from the gap to allow the sump to be twisted and removed from the head.

Each of the plurality of bosses of the sump has a top portion and a bottom portion, wherein the bottom portion of each boss can be substantially horizontally linear. Each of the plurality of bosses of the collar has a top portion and a bottom portion, wherein the top portion of each boss can be substantially horizontally linear corresponding to the substantially horizontally linear bottom portion of each boss of the sump.

Each of the plurality of bosses of the sump has a top portion and a bottom portion, and wherein the bottom portion of each boss can be a peak or a valley. Each of the plurality of bosses of the collar has a top portion and a bottom portion, and wherein the top portion can be a peak or a valley corresponding to each of the plurality of bosses of the collar and are adapted to be self-aligned with the plurality of bosses of the sump.

Preferably, the radial sealing means comprises an O-ring, a quad seal, or a gasket.

Preferably, the means for depressurizing the sump comprises a piston in pressure communication with the sump.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

DETAILED DESCRIPTION OF THE PREFERRED EMBODIMENT(S)

In describing the preferred embodiment of the present invention, reference will be made herein to FIGS. 1 to 8 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of radial sealing means between the head and the sump allows a minimum of force to provide a liquid-tight seal without the need for excess force and tight tolerances essential in prior art filter housings that use axial seals. The filter housing of the present invention provides simplified filter cartridge changes to minimize process downtime and without recourse to tools. A simple twist and lock mechanism holds the filter housing sump. A pressure relief mechanism, alone or in combination with other safety mechanisms, are disclosed as well. An inlet valve mechanism is provided to obstruct the flow of water at the inlet while the filter cartridge is being replaced.

The filter housing of the present invention includes a head in fluid communication with the influent, a filter cartridge, and the effluent, wherein the head includes a collar that has a plurality of bosses located on an inner sidewall; a sump that houses the filter cartridge, wherein the sump includes a plurality of bosses surrounding an outer periphery of the sump that engage the bosses in the head collar; and a radial sealing means positioned between the head and the sump. To seal the filter housing, the sump is brought together with the head wherein the plurality of bosses on the sump are aligned with the plurality of bosses on the collar, and upon twisting the sump, the bosses on the sump are hooked onto a top surface of the bosses on the collar.

Figure 1:
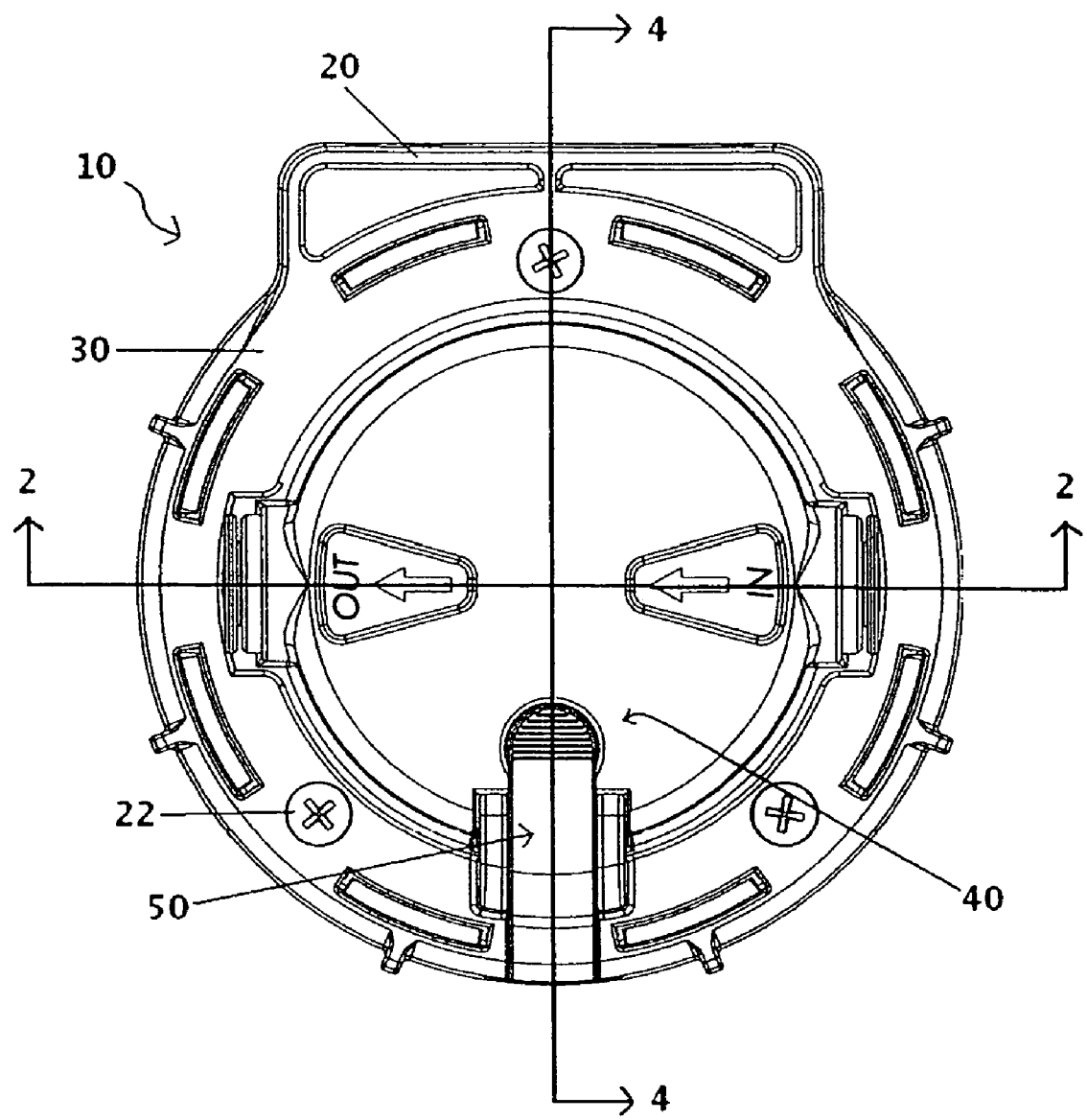
FIG. 1 is a top plan view of the filter housing of the present invention.

FIG. 1 is a top plan view of the filter housing of the present invention. The filter housing has a head 10 that provides fluid communication with an influent, a filter cartridge and the effluent. Mounting feature 20 allows a user to attach head 10 to a wall or other stationary location with mounting screws and the like. Head 10 includes a collar 30 that will be described in more detail below. A pressure release mechanism 40 is provided to depressurize the filter housing prior to releasing sump 15, not seen from this view, from head 10. Release lever 50 engages pressure release mechanism 40 to release substantially all internal pressure within the filter housing prior to releasing sump 15 and can also serve as an alignment and locking mechanism to prevent release of the sump when the filter housing is pressurized and to ensure the alignment of the bosses.

Figure 2:
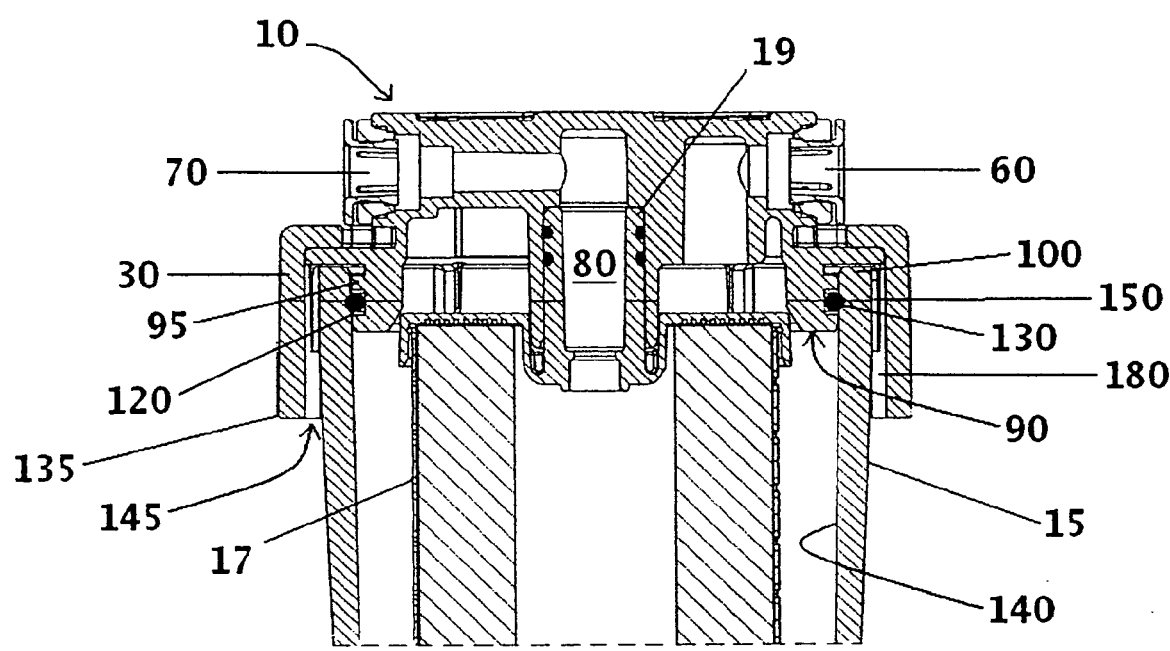
FIG. 2 is a cross-sectional plan view of the filter housing shown in FIG. 1 at line 2—2.

FIG. 2 is a cross-sectional plan view of the filter housing shown in FIG. 1 along lines 2—2. Head 10 has an inlet 60 and an outlet 70. Head 10 has an outlet port 80 wherein a filter cartridge 17 can be inserted therein such that an influent enters inlet 60, flows through the filter cartridge, and the filtered effluent flows out from outlet port 80 to outlet 70. Filter cartridge 17 can have one or more sealing means with a stub end cap, wherein the influent flows into the filter housing through the head inlet, after contacting the filter medium radially flows into the core of the filter cartridge, through the stub end cap 19 and out through the outlet of the head. Head 10 has an opening 90 that corresponds to an opening in sump 15 where the stub end cap of the filter cartridge is inserted therein. Opening 90 has a peripheral rim 95 that sits below sump rim 100 when the head and sump are assembled together. It is desirable to use a filter cartridge with a double O-ring seal on the end cap since such a seal does not require the use of high axial compression forces such as in the case of filters with axially engaged sealing means.

Situated around the circumference of opening 90 is an annular groove 120 with a radial sealing means 130, such as, for example only, an O-ring. The walls of opening 90 fit into sump 15 with little or no resistance for a snug, yet slidable fit. As inner wall 140 of sump 15 tapers in, sealing means 130 within annular groove 120 provides a radial seal that expands outward against the tapered inner wall 140 of sump 15. Sealing means 130 can be an O-ring, quad seal, gasket, and the like, preferably of an elastomeric material. Sump 15 can be "cup" shaped and can be manufactured of polymeric materials using known molding techniques. Alternatively, sump 15 can be made of metal or other design, known to those skilled in the art. In order to manufacture the sump with thinner sidewalls, it is advantageous to incorporate vertical ribbing to strengthen the sidewalls to prevent excessive expansion at elevated pressure and/or incorporate center ribbing at the closed end of the sump to prevent deformation in this portion of the sump.

Sump 15 has a plurality of upper bosses 150 surrounding sump rim 100. Upper bosses 150 can be seen in more detail in FIG. 3 wherein each upper boss is evenly spaced around sump rim 100. The top portion 160 of each upper boss 150 is substantially flush with the top of sump rim 100. The bottom portion 170 of each upper boss can be substantially horizontally linear, or with peaks or valleys. When bottom portion 170' has a peak or valley, the upper bosses and lower bosses are self aligning. However, there must be sufficient contact surface between bottom portion 170' and a corresponding top portion of a lower boss in collar 30 such that the upper bosses and the lower bosses do not become misaligned when the filter housing is pressurized. Preferably, bottom portion 170 is substantially horizontally linear to maximize contact with the corresponding lower boss to lock the sump in position to the head.

Figure 4:
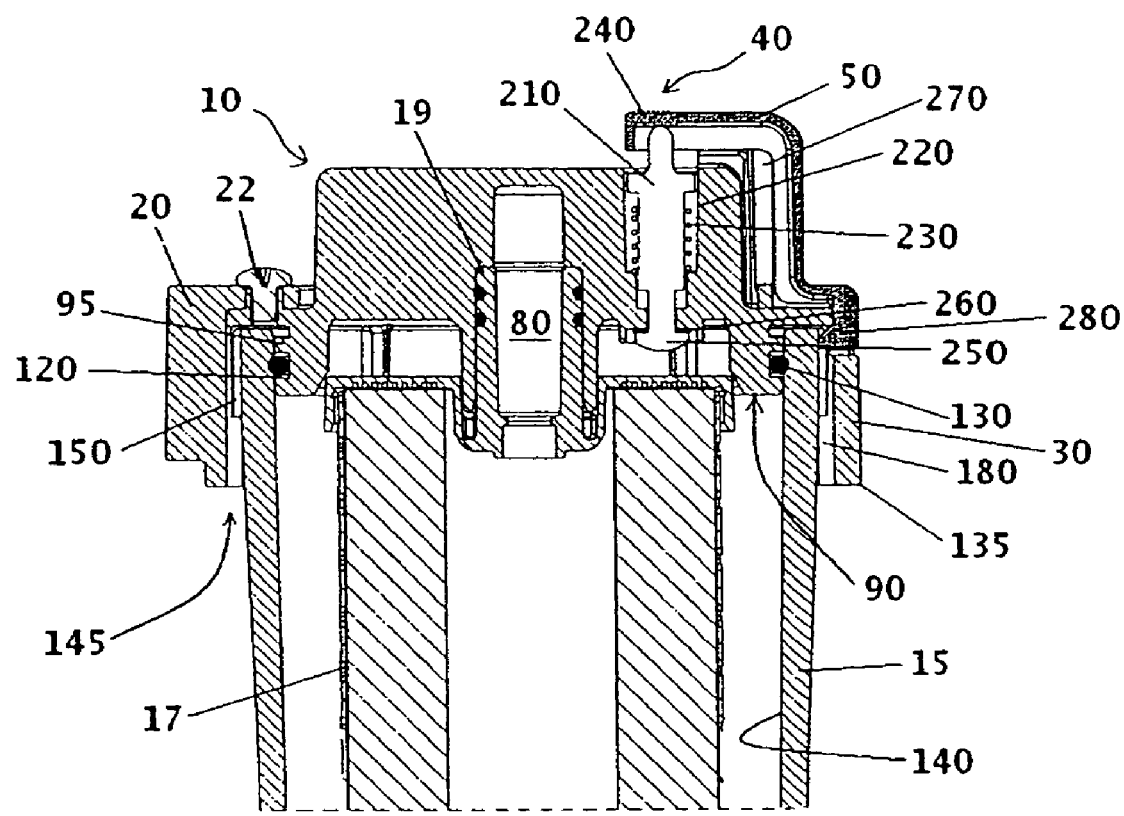
FIG. 4 is a cross-sectional plan view of the filter housing shown in FIG. 1 at line 4—4.

Pressure release mechanism 40, shown in more detail in FIG. 4, a cross-sectional plan view of the head where like features have like reference numerals, is used to depressurize the filter housing. Release lever 50 engages pressure release mechanism 40 to release substantially all internal pressure within the filter housing such that a user may then proceed in releasing sump 15. This is also used to release air trapped in the filter housing during filter startup. Piston 210 extends through head 10 into a cylindrical bore 220 that is in pressure communication with sump 15. Piston 210 is actuated via a spring means 230 that is held within cylindrical bore 220 by resting on interior flange 250. Although a compression spring is shown, any appropriate spring means may be used to actuate piston 210. A portion of release lever 50, pedal 240, is in contact with the top of piston 210 such that upon depressing pedal 240, piston 210 is unseated from interior flange 250 having a gasket 260 to release the pressure within sump 15. Fluid within the filter housing travels up along the sides of cylindrical bore 220 and is released to the atmosphere. When the pressure within the housing has been released, the sump can be twisted and released from the head.

Figures 3, 3A:
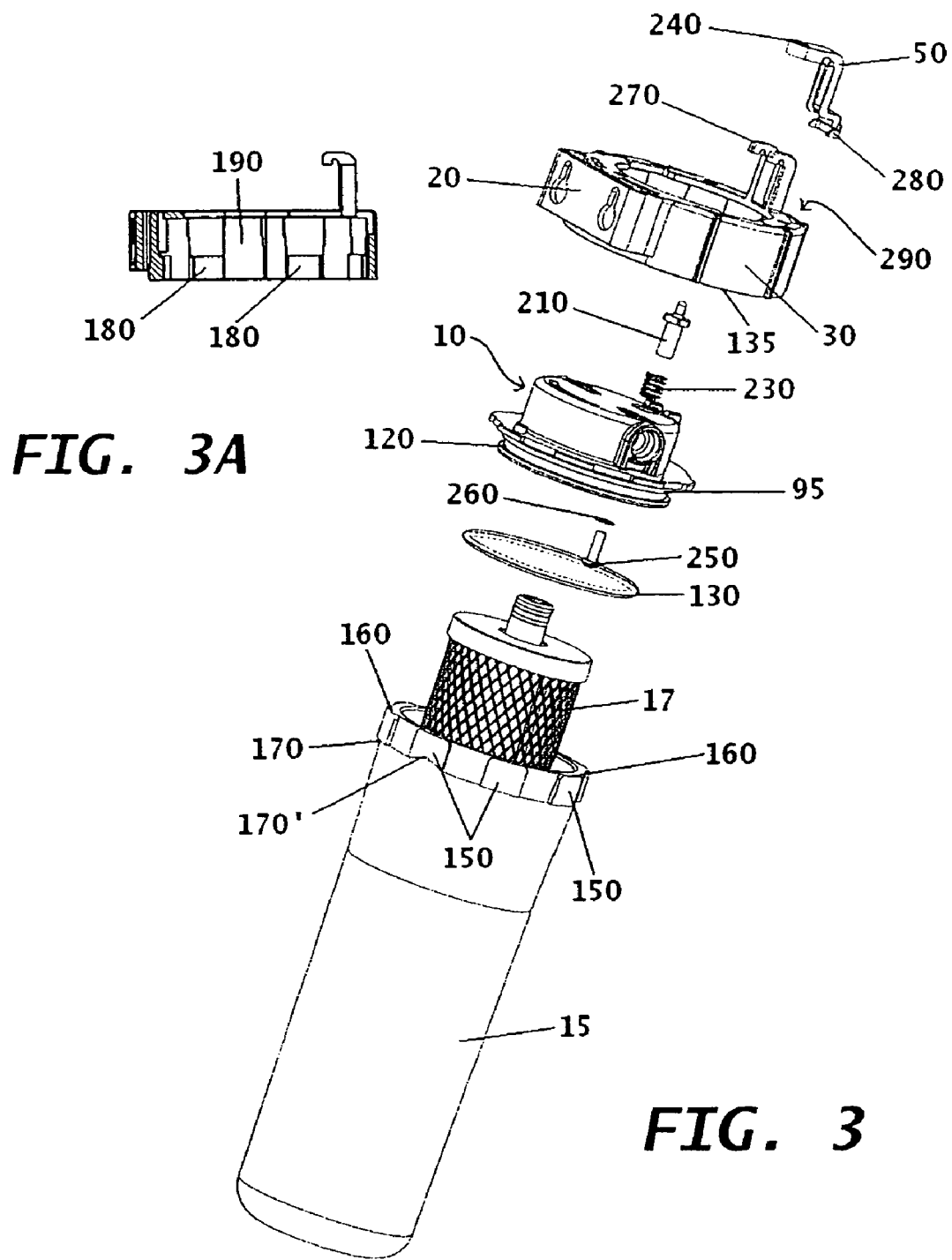
FIG. 3 is a perspective plan view of a sump useful in the filter housing of the present invention.
FIG. 3A is a cross-sectional plan view of the collar shown in FIG. 3.

Release lever 50 is pivotally mounted to bracket 270 extending from collar 30. Release lever 50 has a flange 280 that sits within a cut out 290 in collar 30. Cut out 290 is positioned within a gap 190 between two lower bosses 180, as shown in FIG. 3A, such that when the filter housing is in a closed position with the sump in fluid communication with the head, flange 280 is situated within gap 190 thereby preventing the sump from being twisted open. When the upper and lower bosses are aligned, flange 280 sustains that alignment and prevents the filter housing from being opened until the pressure is released and the sump is twisted to disengage the bosses. Pedal 240 preferably remains depressed by the user to break the alignment of the bosses and allows the sump to slide away from the head.

Referring back to FIG. 2, collar 30 has a lower portion 135 that hangs below opening 90 such that an annular space 145 is created between an inner side wall 140 of collar 30 and an outer sidewall of peripheral rim 95. Collar 30 can be made as a separate piece from head 10 and attached to head 10 by screws 22, although ultrasonic welding, bolts, and the like, can also be used. Alternatively, collar 30 can be manufactured as a single piece with head 10. Inner side wall 140 of collar 30 has a plurality of evenly spaced apart lower bosses 180. Corresponding to the upper bosses on the sump, the top portion of the lower bosses can be substantially horizontally linear, or with peaks or valleys. Thus, if the bottom portion of the upper bosses on the sump have a peak, the corresponding top portion of the lower bosses have a valley, and vice versa. Between lower bosses 180 are gaps 190 that allow upper bosses 150 on the sump to be positioned between lower bosses 180 when the sump is inserted in the annular space 145 between inner side wall 140 of collar 30 and the outer sidewall of peripheral rim 95. The sump is pushed into annular space 145 such that bottom surface 170 of upper boss 150 clears top surface 200 of lower boss 180, and when twisted, upper bosses 150 slide over top surface 200 of lower boss 180 and are locked together thereby securing the sump and head in place.

The contact surface between the lower bosses and the upper bosses should be of a size and shape to sufficiently hold together the head and sump when the filter housing is pressurized. The thickness of upper bosses 150 as they extend beyond the outer surface of sump 15 preferably correlates to the operating pressures of the filter housing. Likewise, the thickness of lower bosses 180 that extend beyond the inner sidewall of collar 30 should be similar to the thickness of the upper bosses to maximize contact surface with the upper bosses. For example, at an operating pressure of about 300 psi, the upper bosses and the lower bosses preferably have a thickness of about 2.3 millimeters. While lower operating pressures require a smaller boss thickness. Thus, for example, at an operating pressure of about 150 psi, the upper bosses and lower bosses preferably have a thickness of about 1.3 millimeters. When the upper and lower bosses are aligned, a gap is created that allows the pressure release mechanism 40 to lock the relative position of the head in relation to the sump. Flange 280 on release lever 50 is substantially seated within one of the gaps between a set of aligned bosses so there is less twisting motion or play of the sump and the head. If alignment of the bosses does not occur, flange 280 cannot be seated within the gap and the filter housing cannot pressurize because release lever 50 of pressure release mechanism 40 is still engaged wherein piston 210 remains unseated from interior flange 250 such that the sump is still open to the atmosphere along the sides of cylindrical bore 220. Only when the bosses are aligned, can flange 280 be seated within one of the gaps to lock the filter housing.

Figure 5:
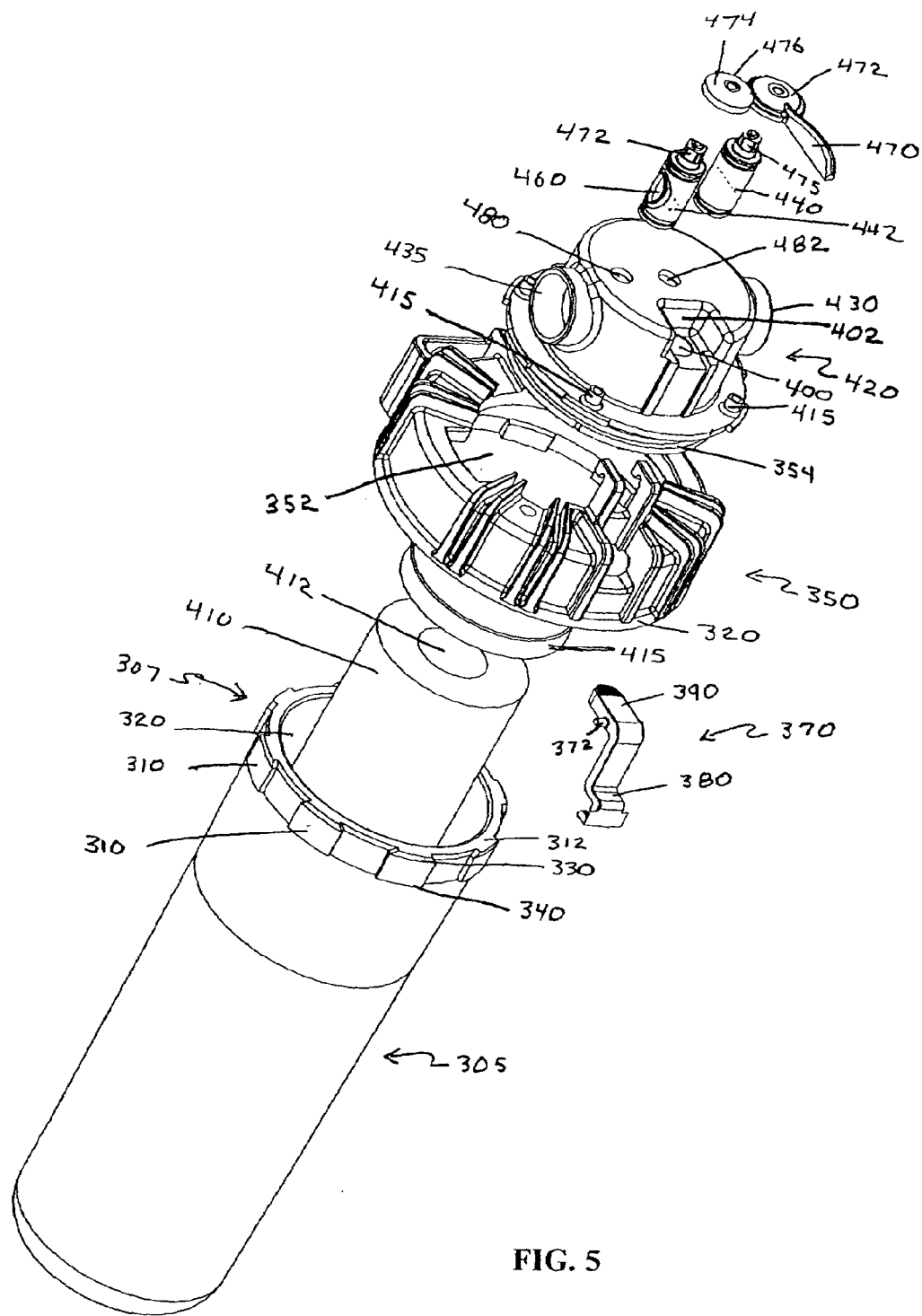
FIG. 5 is a perspective plan view of a sump useful in the filter housing of the present invention showing the inlet valve mechanism for alternating fluid flow and acting as a safety means to prevent sump removal when fluid is flowing through the sump.

FIG. 5 shows filter housing 300 having head 420 and collar 350, said collar 350 having a plurality of upper bosses 410 surrounding collar rim 320. Collar 350 is designed to interlock with lower locking means 307 on sump 305. Locking means 307 has upper bosses 310 and can be seen in detail in FIG. 5 wherein each upper boss is evenly spaced around collar locking means. The top portion 330 of each upper boss 310 is substantially flush with the top of sump rim 312. The bottom portion 340 of each upper boss can be substantially horizontally linear, or with peaks or valleys. When locking means 307 has a peak or valley, the bosses on collar 350 and locking means 307 are self aligning. However, there must be sufficient contact surface between a bottom portion and a corresponding top portion of a lower boss, such that the upper bosses and the lower bosses do not become misaligned when the filter housing is pressurized. Cap 415 is provided to assist in providing fluid sealing when collar 350 engages sump 305 and can be attached by sump 305 by adhesive sealant or other suitable attachment means.

Pressure release mechanism 370, shown in detail in FIG. 5 is used to depressurize the filter housing. Release lever 370 engages opening 400 to release substantially all internal pressure within sump 305 such that a user may then proceed in releasing sump 305. This is also used to release air trapped in the filter housing during filter startup. A portion of lever 370 having pedal 390 is in contact with the top of opening 400 such that upon pressing lever 370, pedal 390 is unseated to release the pressure within sump 305. Fluid within the filter housing travels up along the sides of cylindrical bore 410 and is released to the atmosphere. When the pressure within the sump has been released, the sump can be twisted and released from the head.

Release lever 370 is pivotally mounted to bracket 407 extending from collar 350. Release lever 370 has a flange 372 that sits within a cut out 402 in collar 350. Cut out 402 is positioned within a gap between two lower bosses, as shown in FIG. 5, such that when the filter housing is in a closed position with the sump in fluid communication with the head, flange 372 is situated to thereby prevent the sump from being twisted open. When the upper and lower bosses are aligned, flange 372 sustains that alignment and prevents the filter housing from being opened until the pressure is released and the sump is twisted to disengage the bosses. Pedal 390 preferably remains depressed by the user to break the alignment of the bosses and allows the sump to slide away from the head.

Figure 6:
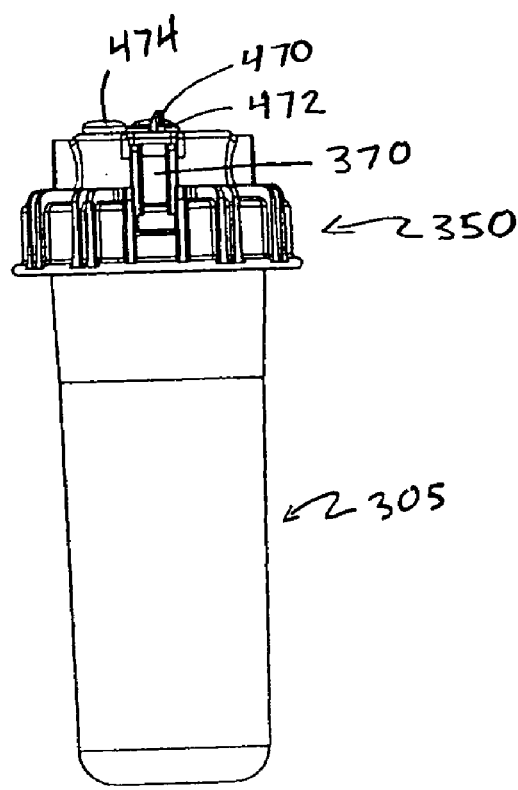
FIG. 6 is a side plan view of the filter housing showing the inlet valve mechanism and outlet valve mechanism.
Figure 7:
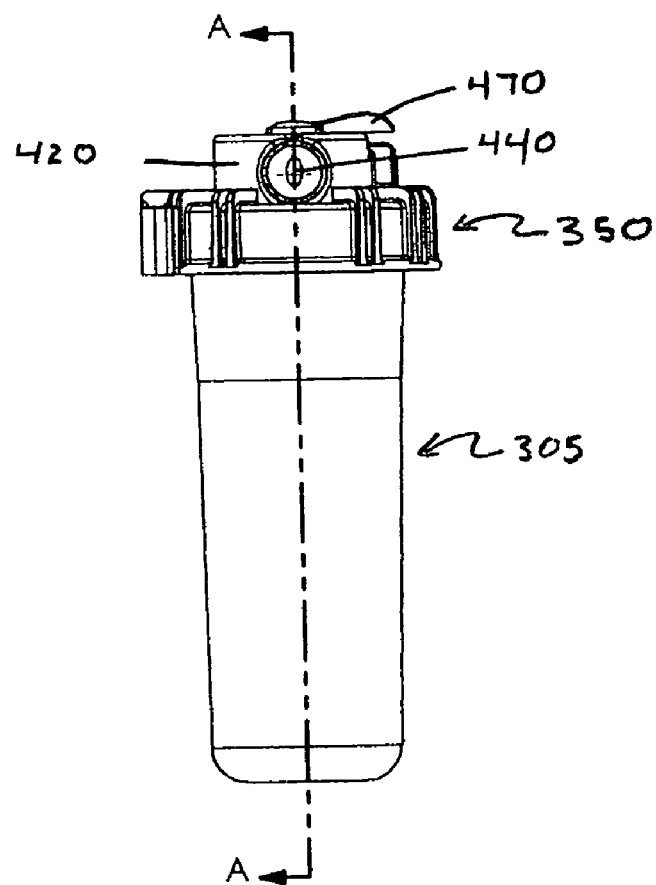
FIG. 7 is a side plan view of the filter housing from the inlet valve side showing the open view of the inlet valve mechanism.
Figure 8:
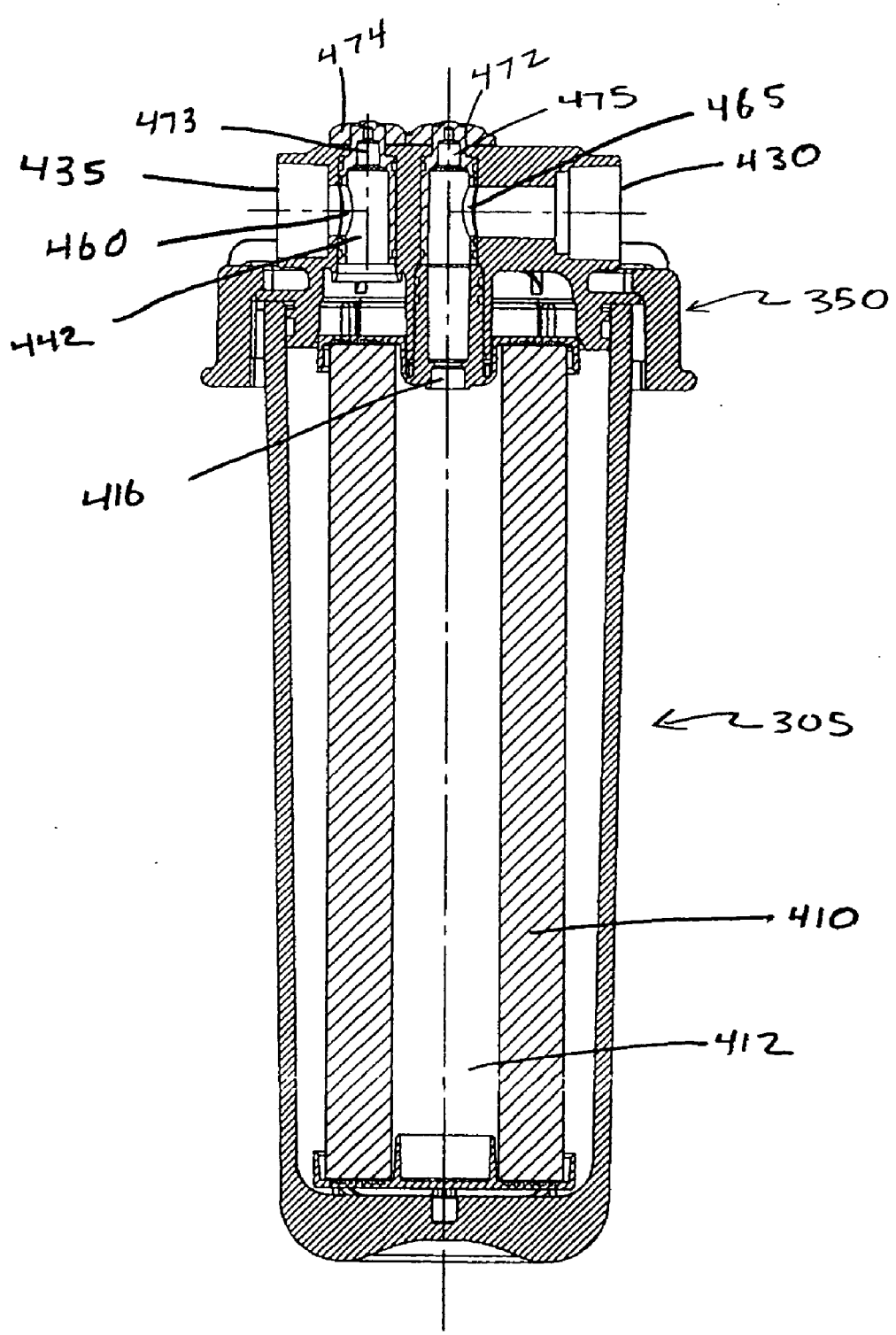
FIG. 8 is a cross-sectional plan view of the filter housing of FIG. 5 when assembled.

Referring to FIG. 6, collar 350 has a lower portion 351 that hangs below opening 320 such that an annular space is created between an inner side wall 320 of collar 350 and an outer sidewall of peripheral rim 312. Collar 350 can be made as a separate piece from the head and be attached to head 420 by screws 415, although ultrasonic welding, and the like, can also be used to secure both parts. Corresponding to the upper bosses on the sump, the top portion of the lower bosses can be substantially horizontally linear, or with peaks or valleys. Thus, if the bottom portions of the upper bosses on the sump have a peak, the corresponding top portions of the lower bosses have a valley, and vice versa. Between lower bosses 310 are gaps 340 that allow upper bosses, not shown, on the sump to be positioned between lower bosses 310 when the sump is inserted in the annular space between inner side wall 320 of collar 350 and the outer sidewall of peripheral rim 312. The sump 305 is pushed into the annular space such that bottom surface of upper boss clears the top surface of the lower boss, and when twisted, upper bosses slide over the top surface of the lower boss and are locked together thereby securing the sump and collar in place.

When the upper and lower bosses are aligned, a gap is created that allows the pressure release mechanism 370 to lock the relative position of the head in relation to the sump. Flange 372 on release lever 370 is substantially seated within one of the gaps between a set of aligned bosses so there is no free twisting motion or play of the sump and the head. If alignment of the bosses does not occur, flange 372 cannot be seated within the gap and the filter housing cannot pressurize because release lever 370 of pressure release mechanism 370 is still engaged wherein pedal 390 remains unseated such that the sump is still open to the atmosphere along the sides of cylindrical bore 412. Only when the bosses are aligned, can flange 372 be seated within one of the gaps to lock the filter housing.

When the filter housing has been pressurized during use, it is advantageous to depressurize the filter housing prior to releasing the sump from the head.

The design of the fluid directing means associated with lever 470 and cylinders 440 and 460 is placed to prevent the depression of pressure relief lever 370 when fluid is directed to pass through sump 305. By placing lever 470 over pedal 390 when fluid is flowing through sump 305 it is not possible to activate the pressure release feature and remove sump 305 until the fluid entering inlet 430 is diverted to exit outlet 435 by movement of lever 470 and redirection of the flow of fluid from sump 305. The feature provides a safety means by preventing the flow of fluid to sump 305 when the disengagement of sump 305 and replacement of filter media 410 is being effected. This safety feature arises from the interaction of the fluid directing means, pressure relief means and collar to provide a safety means for preventing removal of the sump until fluid is diverted from passage through sump 305.

In operation, a user would move lever 470 to divert fluid flow to outlet 435 and then depress lever 370 at flange 380 to move pedal 390 on the pressure release mechanism, to depressurize the sump by moving pedal 390 from opening 400 and enable one to unlock the sump. The user would then grasp the sump and twist the sump such that the upper bosses are no longer sitting above the lower bosses in the collar, but are above the gap portions in the collar for slidably removing the sump from the head and collar.

Associated with collar 350 is head 420 having fluid inlet port 430 and fluid outlet port 435. Within head 420 is contained fluid control cylinders 440 and 450 with fluid flow ports 460 and 465 (not shown) to alternatively permit fluid flow into sump 305 or prevent fluid flow to sump 305 and provide a bypass for fluid during the change of filter media 410 in sump 305. Control cylinders 440 and 450 are placed in head 420 in a misaligned fashion whereby fluid entering fluid inlet 430 will be directed into sump 305 or, alternatively will bypass sump 305 by entering inlet port 430 and exiting outlet port 435. In this manner, incoming fluid passes through the sump without passing through filter media 410 and filter core 412 in sump 305. The alternative fluid flow paths are affected by movement of lever 470 which cause rotation of gear 472 in engagement with gear 474 by gear engagement means 476. Gear 472 and gear 474 are attached to spindle 440 and spindle 442 which are attached to cylinders 440 and 442 when such are protruding through holes 480 and 482 when cylinders 400 and 442 are placed within head 420. Lever 470 may be moved in a bidirectional manner, such that fluid entering inlet port 430 can alternatively pass through filter housing 305 containing filter media 410 and then out of sump 305 and exit from filter housing 300 through exit port 435. When lever 370 is moved to a closed sump configuration the fluid entering inlet port 430 bypasses sump 305 and filter media 410 and directly exits outlet port 435 after entering inlet port 430. In this configuration the fluid exiting exit port 435 is not filtered by filter media 410 contained in filter housing 305.

When the filter housing has been pressurized during use, it is advantageous to depressurize the filter housing prior to releasing the sump from the head.

In operation, a user would depress lever 370 to depressurize sump 305 and disengage pedal. The user would then grasp the sump and twist the sump such that the upper bosses are no longer sitting above the lower bosses in the collar, but are above the gap portions in the collar for slidably removing the sump from the head and collar.

All parts of the filter housing of the present invention can be manufactured from machined metal parts, or plastic parts using known molding techniques.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A filter housing comprising:
    a head having an inlet and an outlet in fluid communication with a filter cartridge;
    a collar surrounding said head having a plurality of lower bosses, said collar forming an annular space between an inner wall of said collar and an outer wall of said head;
    a sump for enclosing the filter cartridge within said filter housing, said sump having a plurality of upper bosses adapted to align with the plurality of lower bosses of said collar and wherein when the housing is in a closed position and the collar is connected to said sump the upper and lower bosses are vertically aligned;
    a radial sealing means for providing a liquid-tight seal between said sump and said head;
    a pressure relief valve for depressurizing said sump prior to removing said sump from said head comprising:
        a piston and compression spring located within said head, said piston having a pressure-sealing portion protruding through said head and in pressure communication with an outer chamber of said sump when said sump is attached to said collar; and
        a release lever pivotally mounted to a bracket extending from said collar, having a flange positioned within a gap between two sets of said vertically aligned bosses on said collar and said sump, such that when said sump is in fluid communication with said head, said flange prevents said sump from being twisted open; and
    a means for locking movement of the plurality of bosses of said sump with the plurality of bosses of said collar when the plurality of bosses are vertically aligned when said sump is inserted into the annular space and twisted.

2. A filter housing of claim 1 wherein each of the plurality of bosses of said sump has a top portion and a bottom portion, wherein the bottom portion of each boss is substantially horizontally linear.

3. A filter housing of claim 2 wherein each of the plurality of bosses of said collar has a top portion and a bottom portion, wherein the top portion of each boss is substantially horizontally linear.

4. A filter housing of claim 1 wherein each of the plurality of bosses of said sump has a top portion and a bottom portion, and wherein the bottom portion of each boss has a peak or a valley.

5. A filter housing of claim 4 wherein each of the plurality of bosses of said collar has a top portion and a bottom portion, and wherein the top portion has a peak or a valley such that the plurality of bosses of said collar are adapted to be self-aligned with the plurality of bosses of said sump.

6. A filter housing of claim 1 wherein said radial sealing means comprises an O-ring, a quad seal, or a gasket.

7. A filter housing of claim 1 wherein upon actuating the piston to depressurize said sump, the flange is also dislocated from the gap between the two sets of vertically aligned bosses and said sump can be twisted and released from said head.

8. A filter housing according to claim 1 having fluid directing means for alternatively directing fluid through said sump enclosing said filter cartridge within said filter housing and bypassing said sump enclosing said filter cartridge thereby permitting changing of said filter cartridge.

9. A filter housing comprising:
    a sump for enclosing a filter cartridge within said filter housing, said sump having a plurality of upper bosses along a top, outer peripheral edge;

a head having an inlet and an outlet in fluid communication with the filter cartridge, said head removably attached to said sump;

a collar surrounding said head forming an annular space between an inner wall of said collar and an outer wall of said head wherein the inner wall of said collar has a plurality of lower bosses corresponding to the upper bosses on said sump and wherein when the housing is in a closed position and the collar is connected to said sump the upper and lower bosses are vertically aligned;

a radial sealing means for providing a liquid-tight seal between said sump and said head;

a mechanism for depressurizing said sump and for preventing removal of said sump comprising:

a piston and compression spring located within said head, said piston having a pressure-sealing portion protruding through said head and in pressure communication with an outer chamber of said sump when said sump is attached to said collar; and a release lever pivotally mounted to a bracket extending from said collar, having a flange positioned within a gap between two sets of said vertically aligned bosses on said collar and said sump, such that when said sump is in fluid communication with said head, said flange prevents said sump from being twisted open.

10. A filter housing of claim 9 wherein said radial sealing means comprises an O-ring, a quad seal, or a gasket.

11. A filter housing of claim 9 wherein the plurality of upper bosses each have a top portion and a bottom portion, wherein the bottom portion of an upper boss is substantially horizontally linear.

12. A filter housing of claim 11 wherein the plurality of lower bosses each have a top portion and a bottom portion, wherein the top portion of a lower boss is substantially horizontally linear.

13. A filter housing of claim 9 wherein the plurality of upper bosses each have a top portion and a bottom portion, wherein the bottom portion has a peak or a valley.

14. A filter housing of claim 13 wherein the plurality of lower bosses each have a top portion and a bottom portion, wherein the top portion has a corresponding peak or a valley such that the upper and lower bosses are self-aligning.

15. A filter housing according to claim 9 having fluid directing means for alternatively directing fluid through said sump enclosing said filter cartridge within said filter housing and bypassing said sump enclosing said filter cartridge thereby permitting changing of said filter cartridge.

16. A filter housing according to claim 15 where in said fluid directing means provides a safety means for preventing removal of the sump until fluid is diverted from passage through the sump.

17. A filter housing comprising:

a head having an inlet and an outlet in fluid communication with a filter cartridge;

a collar surrounding said head having a plurality of lower bosses, said collar forming an annular space between an inner wall of said collar and an outer wall of said head;

a sump for enclosing the filter cartridge within said filter housing, said sump having a a plurality of upper bosses adapted to align with the plurality of bosses of said collar and wherein when the housing is in a closed position and the collar is connected to said sump the upper and lower bosses are vertically aligned;

a radial sealing means for providing a liquid-tight seal between said sump and said head;

a pressure relief valve for depressurizing said sump prior to removing said sump from said head comprising:

a piston and compression spring located within said head, said piston having a pressure-sealing portion protruding through said head and in pressure communication with an outer chamber of said sump when said sump is attached to said collar; and a release lever pivotally mounted to a bracket extending from said collar, having a flange positioned within a gap between two sets of said vertically aligned bosses on said collar and said sump, such that when said sump is in fluid communication with said head, said flange is situated between said bosses, preventing said sump from being twisted open;

a means for locking movement of the plurality of bosses of said sump with the plurality of bosses of said collar when the plurality of bosses are vertically aligned when said sump is inserted into the annular space and twisted; and a fluid directing means for alternatively directing fluid through said sump enclosing said filter cartridge within said filter housing and bypassing said a sump enclosing said filter cartridge thereby permitting changing of said filter cartridge.

18. A filter housing according to claim 17 where in said fluid directing means provides a safety means for preventing removal of the sump until fluid is diverted from passage through the sump.

* * * * *